Patented Mar. 9, 1926.

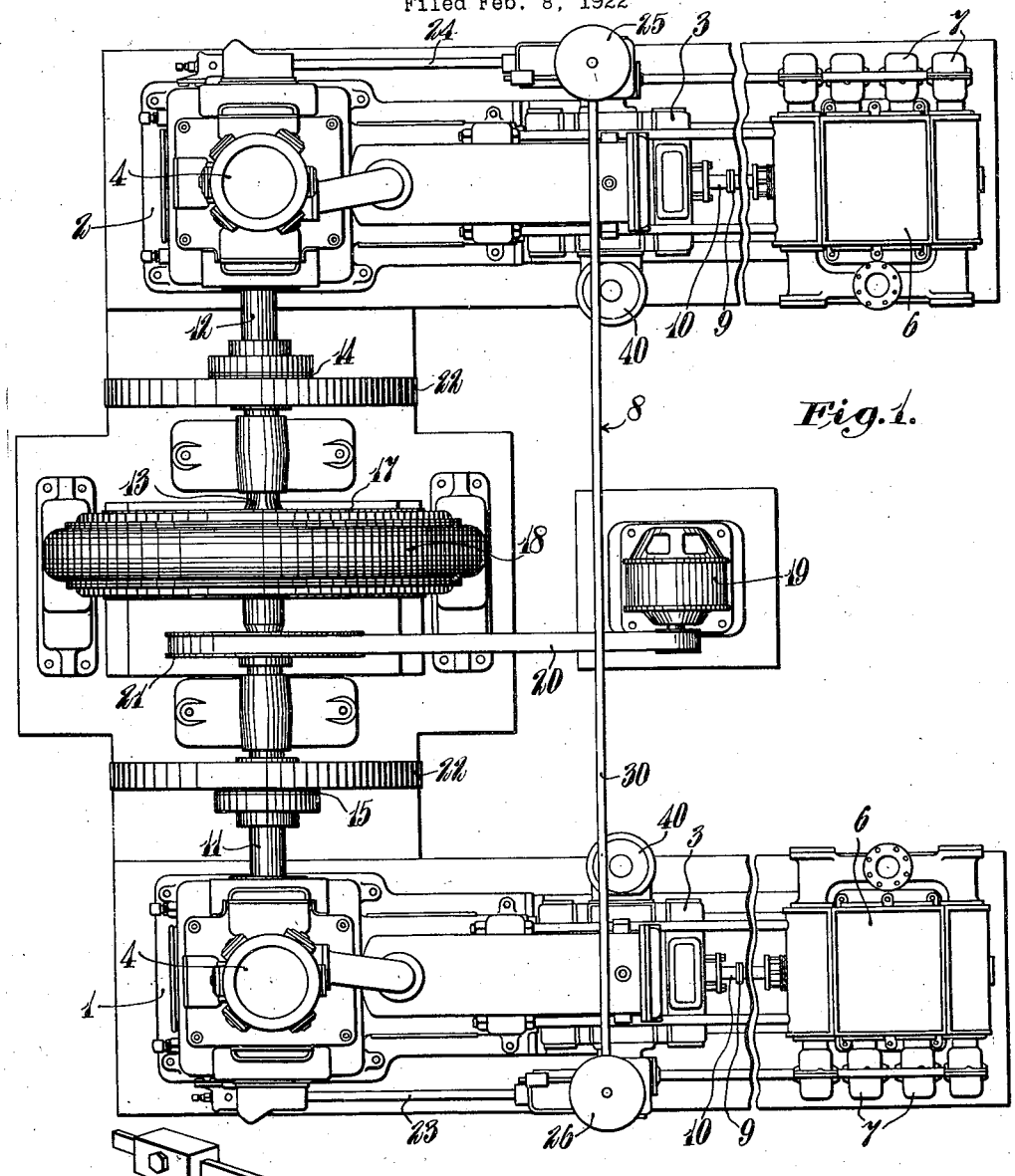

1,575,981

UNITED STATES PATENT OFFICE.

ALEXANDER D. FERGUSON, OF OAK PARK, ILLINOIS, ASSIGNOR TO SULLIVAN MACHINERY COMPANY, A CORPORATION OF MASSACHUSETTS.

POWER PLANT.

Application filed February 8, 1922. Serial No. 534,898.

*To all whom it may concern:*

Be it known that I, ALEXANDER D. FERGUSON, a citizen of the United States, residing at Oak Park, in the county of Cook and State of Illinois, have invented certain new and useful Improvements in Power Plants, of which the following is a full, clear, and exact specification.

My invention relates to power plants, and more particularly to power plants for the generation of compressed air and electric current.

An object of my invention is to provide an improved power plant. Another object of my invention is to provide an improved power plant for use in mines. A further object of my invention is to provide an improved power plant whose normal function shall be the compression of air for use in mines or other places and which shall be either electrically or steam driven. A still further object of my invention is to provide a power plant of the class described in which in emergencies the air compressing function may be discontinued and the power plant employed as an electrical current generating system. A still further object of my invention is to provide an air compressing plant of relatively large capacity in which the various units going to make up the plant may be independently used whereby a high efficiency of that portion of the plant in use may be obtained. Further objects of my invention will hereinafter more fully appear.

In the accompanying drawings I have shown for purposes of illustration one form which my invention may assume in practice.

In these drawings,—

Fig. 1 is a plan view of a power plant constructed according to the illustrative form of my invention.

Fig. 2 is a detail showing the manner of connection of the governor mechanisms.

In many mines it is necessary to employ pumps to keep the mines cleared of water and these pumps are frequently electrically driven. In some mining regions the sources of electrical current are frequently interfered with by heavy storms and accordingly the electrically driven pumps may fail and reliance have to be placed upon emergency pumps which have to be, of course, of some other type as, for example, steam pumps. As these latter pumps are not used except in emergency they frequently fail to operate when suddenly called on, and require, in view of the infrequency of their use, an inordinate amount of care to maintain them in workable condition ready for any emergency. It is well known that in most mining operations a large amount of compressed air is required and I have devised means for supplying compressed air in the necessary quantities and means which is capable of supplying electrical current in an emergency for the operation of the mine pumps, the entire system constituting a power plant of very advantageous characteristics.

The illustrative form of my invention comprises a pair of compressors 1 and 2, herein of the angle compound type, the same having horizontal low pressure cylinders 3 and vertical high pressure cylinders 4, respectively. Driving means for these compressors is provided of two types. Steam motors having cylinders 6 are arranged in alinement with the low pressure cylinders 3 and these steam cylinders, which are shown provided with cam gears 7 controlled by governor mechanism generally designated 8, hereinafter more fully described, have their pistons detachably connected by connections 9 to extensions 10 of the piston rods of the low pressure compressor pistons. When the connections 9 are made, it will be evident that by the supply of steam to the motors 6, which are herein of the high compression, jacketed head, direct flow, cam gear type, the compressors 1 and 2 may be steam driven. It will be noted that the compressors 1 and 2 have crank shafts 11 and 12 which are operatively connected by a shaft 13 and connecting means 14 and 15 whereby the two compressors may be run simultaneously and at uniform speeds. Upon the shaft 13 is fixed the armature 17 of a dynamo 18, herein of the synchronous type, and capable of use either as a motor or generator, and which is excited by a small exciter generator 19 driven by a belt 20 from a pulley 21 mounted upon the shaft 13. By reason of the presence of the relatively heavy armature, fly wheels of much smaller size may be used and I have shown a pair at 22, 22. Driven from the shafts 11 and 12 are shafts 23 and 24 which drive fly ball governors, or governors of any other suitable type, 25 and 26, respectively. Of these governors the governor 25 is what may be called a governor of relatively long range and of a type especially adapted for controlling a compressor driving engine, while the governor 26 is a very close regulation governor and particularly adapted to govern a generator driving engine.

It will be noted from Figure 2 that a transverse shaft 30 extending between the two compressors is provided with arms 31 (of which but one is shown) rotatably mounted thereon and adjustably connected by links 32 to the valve gears 7. The governors 25 and 26, of which 26 alone is shown in Fig. 2 are detachably and adjustably connected by adjustable links 33 and removable pins 34 to the arms 31, while by clutches 35 the arms 31 are attachable or releasable at will with respect to the shaft 30.

By means of the mechanism described it will be evident that, by removing either of the pins 34, and swinging the links 33 out of the way, either governor 25 or 26 may be disconnected from the arm 31 to which it is normally attached and thereby both arms 31 and both valve gears 7 may be controlled by either governor. It will also be evident that by releasing the clutch 35 which connects the arm 31 cooperating with the governor 25 from the shaft 30, the compressor 1 may be rendered entirely independent of the compressor 2 and may be operated as a separate unit, thereby giving high efficiency when low output of compressed air is necessary. When it is desired to operate both compressors together, the arms are connected by the clutches 35 to the shaft 30 and the governor 25 is connected by its pin 34 and link 33 to its arm 31. When it is desired to use both compressors 1 and 2 to drive the dynamo 18 as a generator for the production of current in an emergency, the governor 25 is disconnected and the governor 26 is employed to control the valve gears of both the steam motors. When desired, the connections 9 may be broken and the dynamo 18 used to drive the compressors and this dynamo then drive either one or both compressors as desired by simply disconnecting the connection 14 or 15, if but one compressor is wanted. Unloading means 40 is provided for each of the compressors and when about to drive the dynamo 18 as a generator, the compressors will of course be unloaded. It will be understood that the mechanism shown in Figure 2 is purely diagrammatic and that any other mechanism can be used that is desired, it being readily possible to devise numerous arrangements for the accomplishment of my improved modes of operation.

From the foregoing description the mode of operation of this device will already be obvious, but to recapitulate, it may be stated that the plant may be used to provide a relatively small output of air at high efficiency by disconnecting the coupling 14 and the connection between the shaft 30 and the arm 31 controlled by governor 25, compressor 2 then running as a steam driven compressor. It will also be understood that by disconnecting the coupling 9 between the steam motor 6 and the compressor 1, the compressor 1 may be electrically driven, the coupling 14 being released and 15 connected. By connecting both the connections 14 and 15 and disconnecting the connections 9, I have an electrically driven twin compound compressor. By reconnecting the connections 9 I have a twin compound steam driven compressor. By unloading the compressors 1 and 2 by means of the unloading means 40, I can drive the dynamo 18 as a generator and supply current for emergency purposes, the compressors then requiring almost no power and practically the full power of the steam motors being employed for the generation of current. Further uses and modes of employment of my device will occur to those skilled in this art.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a compressor, an engine, an electrical apparatus, and means whereby said compressor may be driven by said engine and apparatus or said apparatus driven as a generator by said engine.

2. In combination, a compressor, a steam engine, an electrical apparatus adapted to serve either as a generator or a motor, and means whereby said compressor may be driven by said engine or apparatus and said apparatus driven as a generator by said engine through a compressor connection.

3. In combination, a compressor, a steam engine, an electrical apparatus adapted to serve either as a generator or a motor, means whereby said compressor may be driven by said engine or apparatus and said apparatus driven as a generator by said engine through a compressor connection, and means for unloading said compressor when said apparatus is being driven by said engine.

4. In a power plant, a plurality of steam driven compressors, and a dynamo intermediate said compressors, said compressors and dynamo having alined releasably connected shafts.

5. In a power plant, a pair of steam driven compressors having detachably connected crank shafts, a dynamo associated with said compressors and operatively connected with said crank shafts, and common governing means for said steam driven compressors.

6. In a power plant, a pair of steam driven compressors having driving motors detachably connected thereto and a dynamo also detachably connected thereto, one of said compressors being operative independently of the other either by said steam driving motor or by said dynamo.

7. In a power plant, a pair of steam driven compressors having driving motors detachably connected thereto, and a dynamo also detachably connected thereto, one of said compressors being operative independently of the other either by said steam driving motor or by said dynamo, and said dynamo being operable by said steam driving motors.

8. In a power plant, a pair of compressors having steam driving motors detachably connected thereto and a dynamo also detachably connected thereto, and governing means for said steam motors including means for interconnecting the valve gears thereof and governors associated with each motor and alternately connectible to said interconnected valve gears.

9. In a power plant, a pair of compressors having single stage steam driving motors detachably connected thereto and having unloading means, and a dynamo connectible with said compressors, said motors or said dynamo being operative to drive said compressors, or said motors being operative to drive said dynamo as a generator, said motors having different governors for use when driving said compressors and when driving said dynamo.

10. In a power plant, a pair of compressors having single stage steam driving motors detachably connected thereto and having unloading means, and a dynamo connectible with said compressors, said motors or said dynamo being operative to drive said compressors, or said motors being operative to drive said dynamo as a generator, said motors having independent valve gears and independent governors, but said valve gears being connectible for simultaneous control and one of said governors controlling both valve gears when the motors are driving said compressors and the other controlling said valve gears when said motors are driving said dynamo as a generator.

11. In a power plant, a pair of compressors having single stage steam driving motors detachably connected thereto and having unloading means, and a dynamo connected with said compressors, said motors or said dynamo being operative to drive said compressors or said motors being operative to drive said dynamo as a generator when said compressors are unloaded, and said motors having different governors each of which may control both motors and operative respectively dependent upon whether said motors are driving the compressor loaded or driving the dynamo.

In testimony whereof I affix my signature.

ALEXANDER D. FERGUSON.